Figure 1:
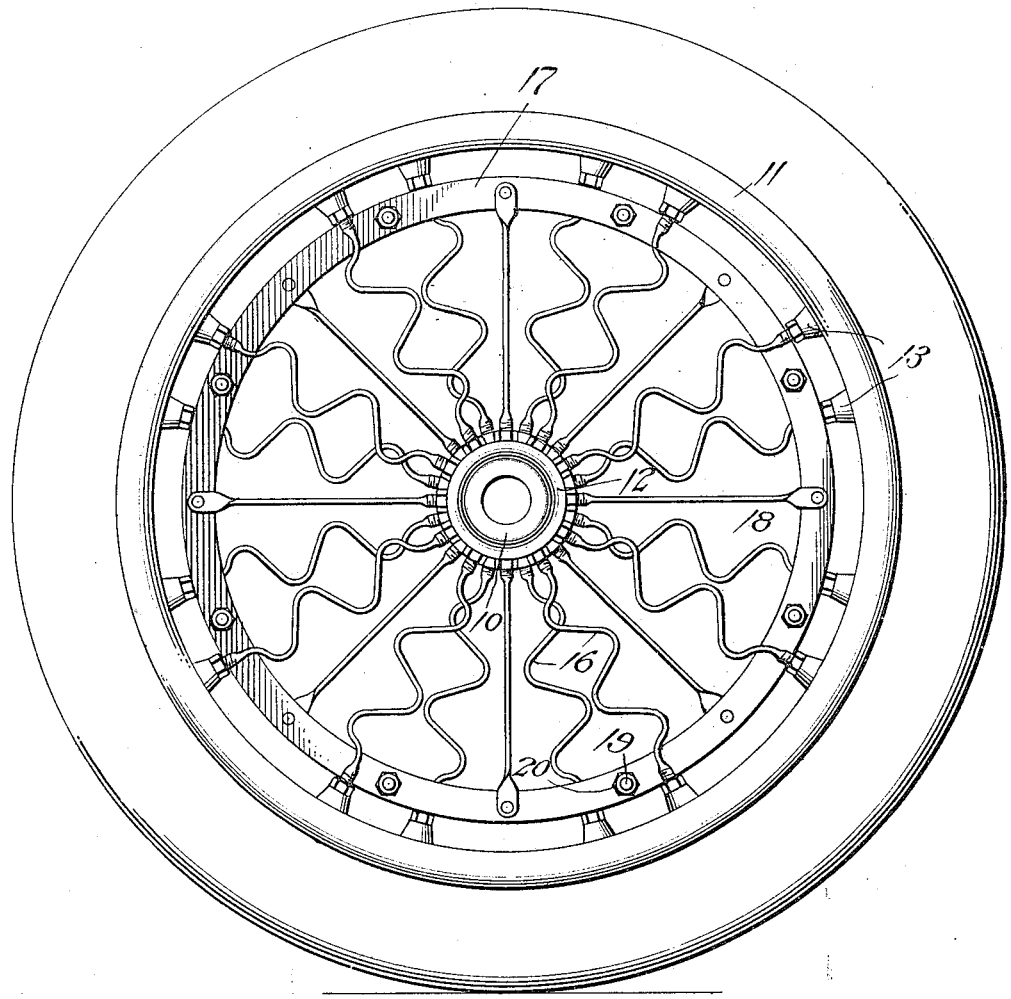

F. ROMAIN.
RESILIENT WHEEL.
APPLICATION FILED NOV. 2, 1914.

1,212,263.

Patented Jan. 16, 1917.
2 SHEETS—SHEET 1.

Inventor
Fredrich Romain,

Witnesses

By Richard Owen.
Attorney

F. ROMAIN.
RESILIENT WHEEL.
APPLICATION FILED NOV. 2, 1914.
1,212,263.
Patented Jan. 16, 1917.
2 SHEETS—SHEET 2.
Fig. 2.
Fig. 3.
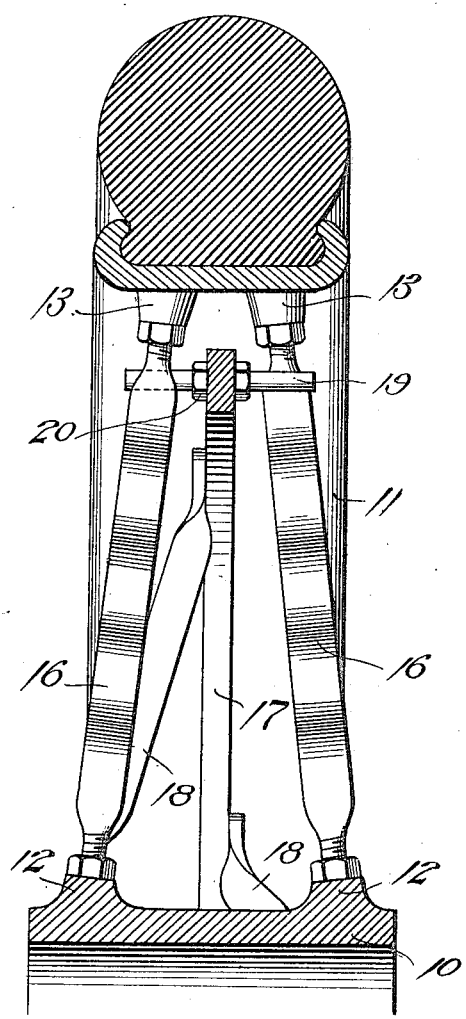
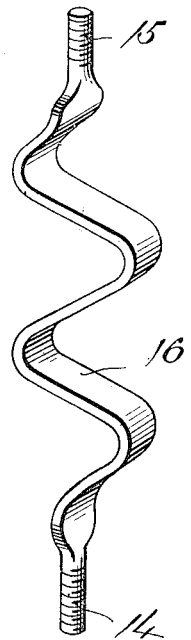
Witnesses
Inventor
Fredrich Romain,
By Richard Oliver,
Attorney

UNITED STATES PATENT OFFICE.

FREDRICH ROMAIN, OF MARIAS, MONTANA.

RESILIENT WHEEL.

1,212,263. Specification of Letters Patent. Patented Jan. 16, 1917.

Application filed November 2, 1914. Serial No. 869,967.

*To all whom it may concern:*

Be it known that I, FREDRICH ROMAIN, a citizen of the United States, residing at Marias, in the county of Chouteau and State of Montana, have invented certain new and useful Improvements in Resilient Wheels, of which the following is a specification.

This invention relates to a resilient wheel and the principal object of the invention is to provide the wheel with improved spokes and also provide improved means for bracing the wheel and preventing the spokes from being broken by going over rough roads.

Another object of this invention is to provide improved means for securing the end portions of the spokes with the hub and wheel rim thus permitting one spoke to be removed without it being necessary to remove all of the spokes.

Another object of the invention is to so mount the spokes and bracing means that the spokes will be braced against transverse movement and also prevent them from being broken by the axle of a car moving vertically beyond a desired amount.

This invention is illustrated in the accompanying drawings, wherein:

Figure 1 is a view in elevation of a wheel provided with the improved construction. Fig. 2 is an enlarged sectional view of the wheel showing Fig. 1. Fig. 3 is a perspective view of one of the spokes.

The hub 10 and rim 11 are provided with internally threaded sockets 12 and 13 which receive the threaded stems 14 and 15 of the crimp spokes 16. These spokes 16 which are formed of spring steel have the stems 14 threaded in an opposite direction to the stems 15 so that when the spokes are turned the stems will be moved into or out of the sockets 12 and 13 according to the direction in which the spokes are rotated. It is to be noted that the spokes extend radially from the respective sides of the hub and in convergent relation with each other toward the rim, the spokes on one side being incidentally arranged alternately to the spokes on the other so as to effectively prevent them from yielding when the wheel is subjected to lateral stress such as is ordinarily occasioned when the vehicle to which the wheel is connected is turning a corner.

The bracing band or hoop 17 extends between the spokes 16 as shown in Figs. 1 and 2 and is held in spaced relation to the hub by the rods 18 which extend radially, from the hub from between the spokes and also in convergent relation with each other being secured upon opposite sides of the hoop to prevent lateral movement thereof. This hoop will therefore prevent the spokes from having transverse movement which would be liable to cause the spokes to be bent when going over a rough road. In order to prevent the hub from turning independently of the rim 11 and thus causing the spokes to be twisted out of shape there have been provided rods 19 which pass through the hoop 17 and are secured in place by the jam nuts 20. These rods 19 are positioned between pairs of spokes as shown in Fig. 1 and thus not only serve to prevent the hoop from having independent rotation with respect to the rim but also serve to engage the outer end portions of the spokes and thus prevent the spokes from being bent longitudinally beyond a desired amount in case the automobile is very severely jolted.

If it is desired to remove one of the spokes in order to replace it with a new one it is simply necessary to rotate the spoke in the proper direction until its ends move out of the sockets 12 and 13 and to then insert the new spoke.

What is claimed is:—

A wheel including a hub, a rim, removably mounted spring spokes extending radially from the respective sides of the hub and converging toward and connected to the rim to effectively brace the rim to the hub and prevent lateral movement thereof, the spokes on one side being also arranged in staggered relation with the spokes on the other side, a hoop arranged between the spokes, rigid rods extending in convergent relation from the opposite sides of the hub between said spokes terminating short of the rim and connected upon opposite sides of the hoop to prevent lateral movement of the hoop and to normally hold the hoop in spaced relation with the rim, and abutment pins extending transversely through the hoop at uniformly spaced intervals and arranged between the adjacent spokes so as to engage the outer end portions of said spokes.

In testimony whereof I affix my signature in presence of two witnesses.

FREDRICH ROMAIN.

Witnesses:
SPELLMAN H. VILES,
FRANK BAKER.

Copies of this patent may be obtained for five cents each, by addressing the "Commissioner of Patents, Washington, D. C."